No. 12,207. REISSUED MAR. 22, 1904.
J. REICHMANN.
FLUID PRESSURE BRAKE APPARATUS.
APPLICATION FILED JAN. 9, 1904.
5 SHEETS—SHEET 1.
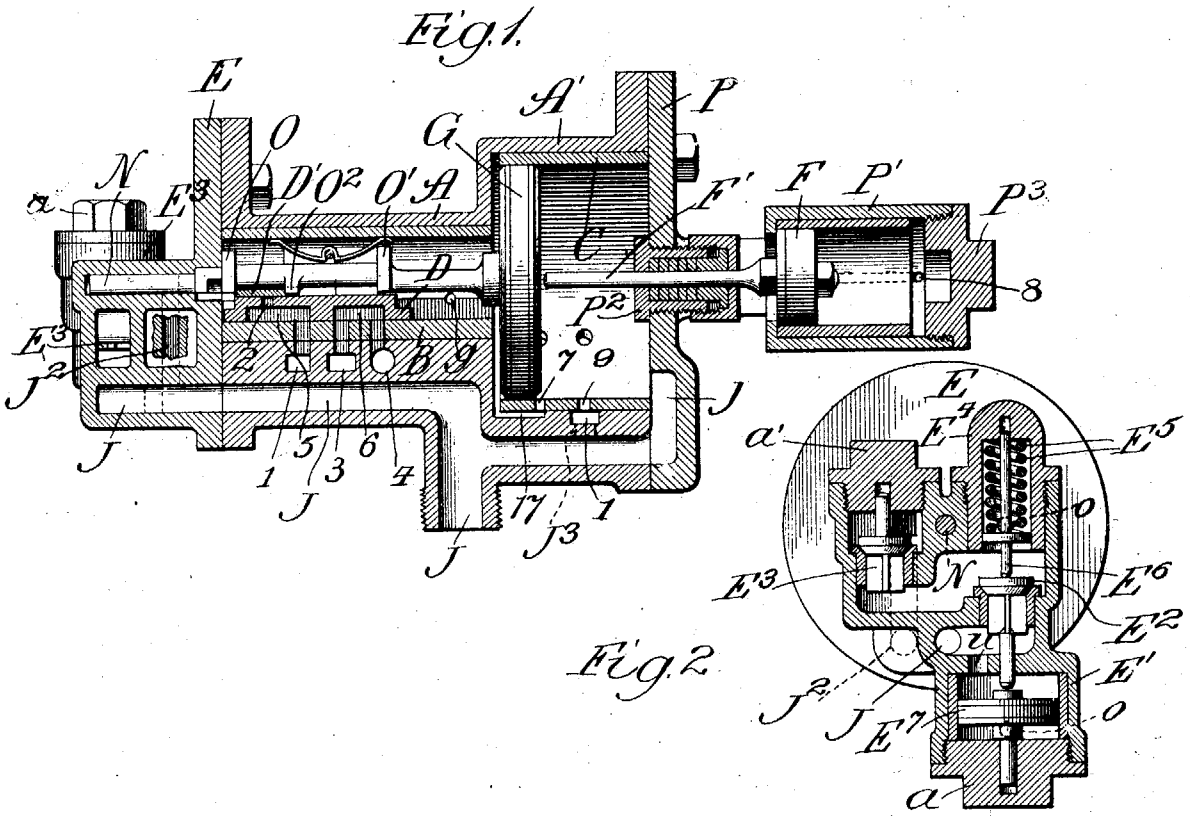
Witnesses:
Chas. E. Taylord.
Geo. C. Dorion.
Inventor:
Joseph Reichmann,
By Dyrenforth, Dyrenforth & Lee,
Attys No. 12,207. REISSUED MAR. 22, 1904.
J. REICHMANN.
FLUID PRESSURE BRAKE APPARATUS.
APPLICATION FILED JAN. 9, 1904.
5 SHEETS—SHEET 2.
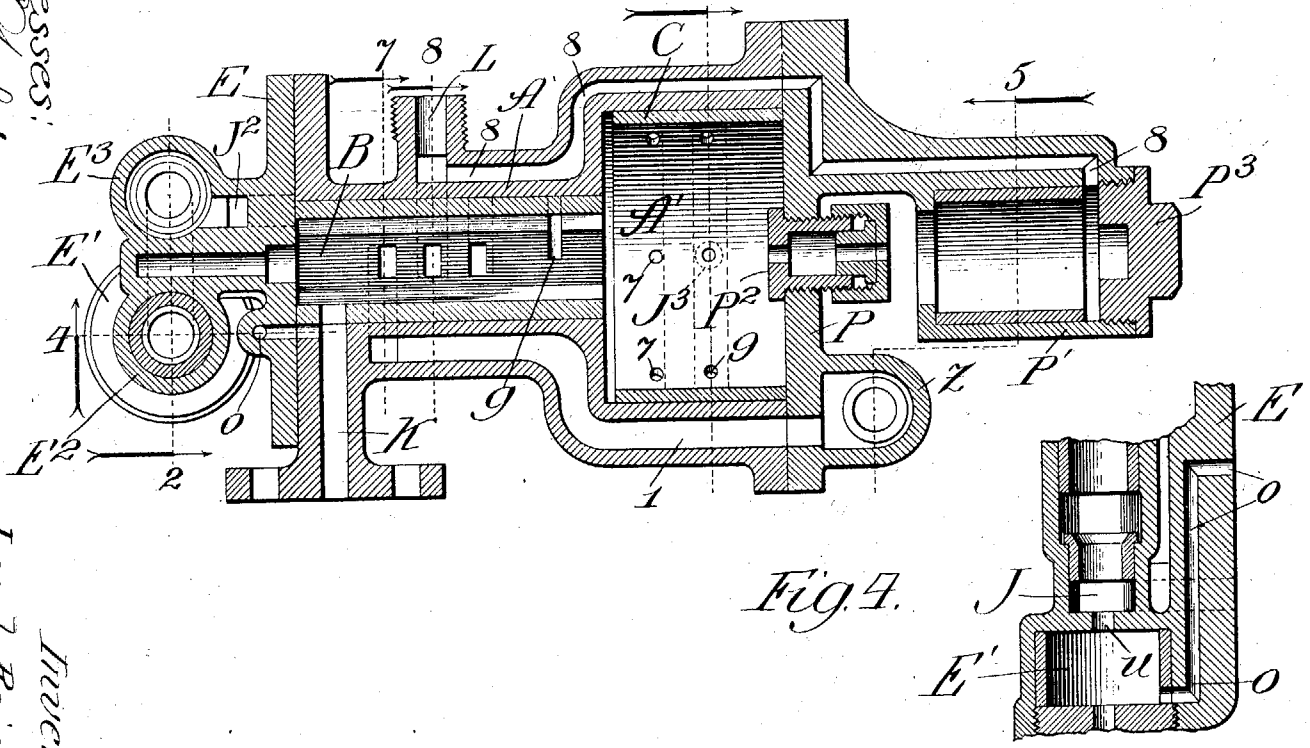
Witnesses:
Chas. C. Gaylord,
Geo. C. Darrow
Inventor:
Joseph Reichmann,
By Dyrenforth, Dyrenforth & Lee,
Att'ys No. 12,207. REISSUED MAR. 22, 1904.
J. REICHMANN.
FLUID PRESSURE BRAKE APPARATUS.
APPLICATION FILED JAN. 9, 1904.
5 SHEETS—SHEET 3.
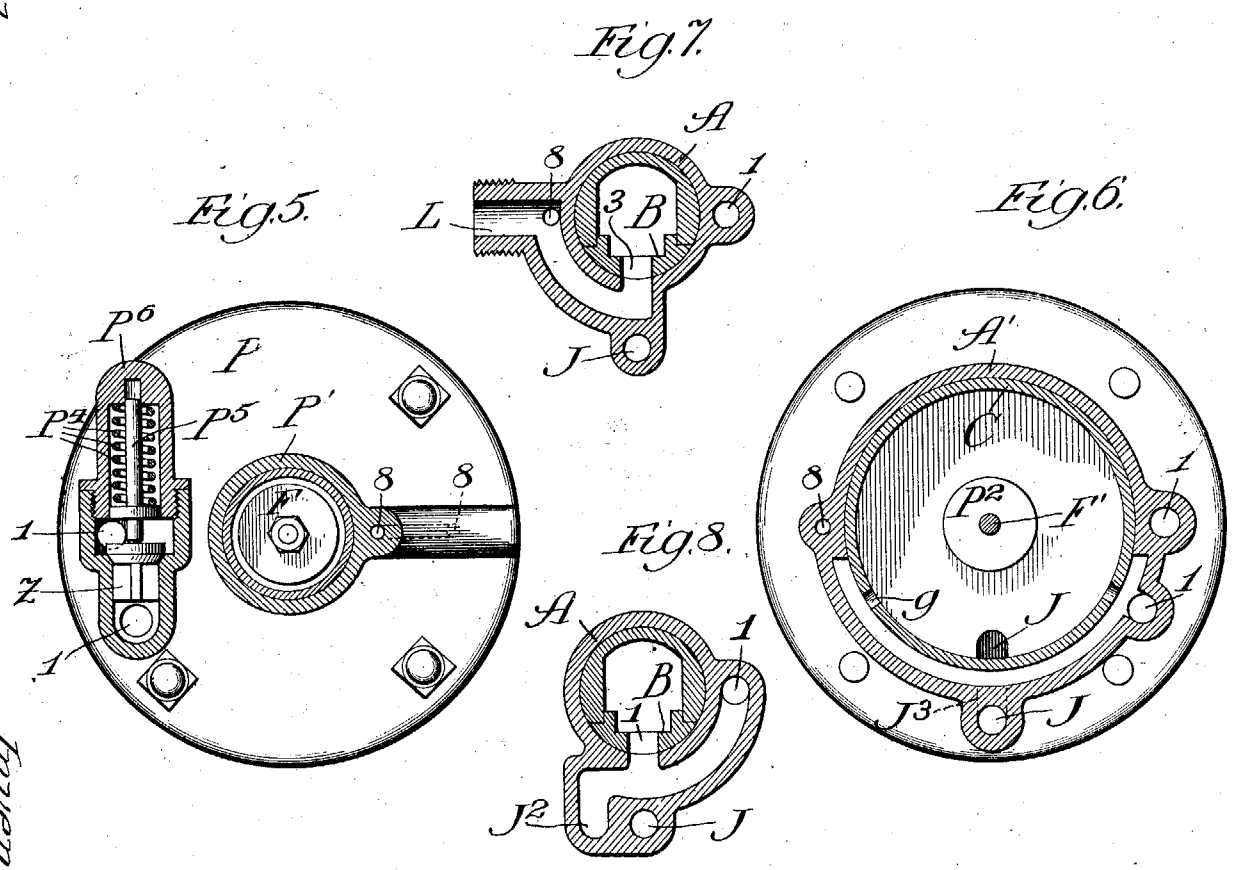
Witnesses:
Ed. S. Taylor.
Geo. C. Dorion.
Inventor:
Joseph Reichmann,
By Dyrenforth, Dyrenforth & Lee,
Attys.

No. 12,207. REISSUED MAR. 22, 1904.
J. REICHMANN.
FLUID PRESSURE BRAKE APPARATUS.
APPLICATION FILED JAN. 9, 1904.
5 SHEETS—SHEET 4.
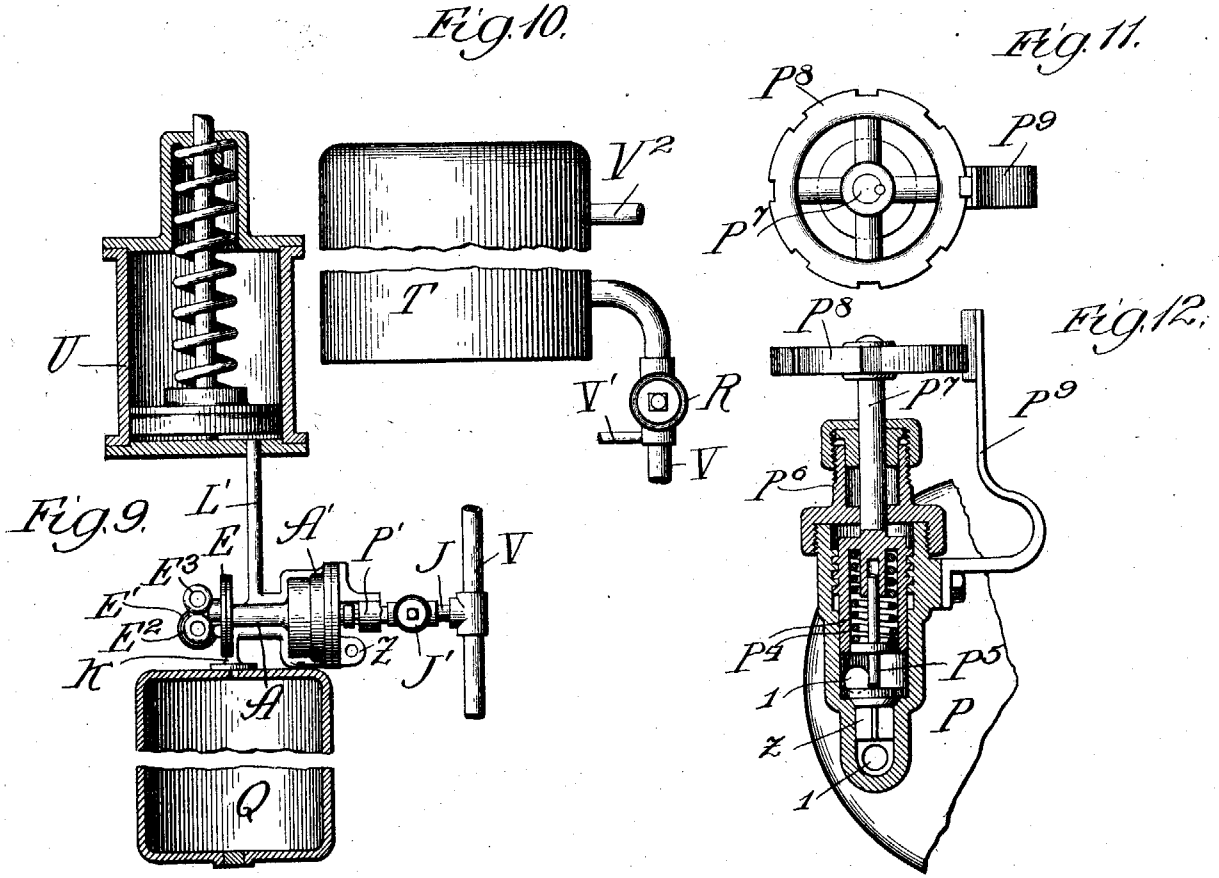
Witnesses:
Geo. E. Gaylord,
Geo. E. Larson.
Inventor:
Joseph Reichmann,
By Dyrenforth, Dyrenforth & Lee,
Attys.

No. 12,207. REISSUED MAR. 22, 1904.
J. REICHMANN.
FLUID PRESSURE BRAKE APPARATUS.
APPLICATION FILED JAN. 9, 1904.
5 SHEETS—SHEET 5.
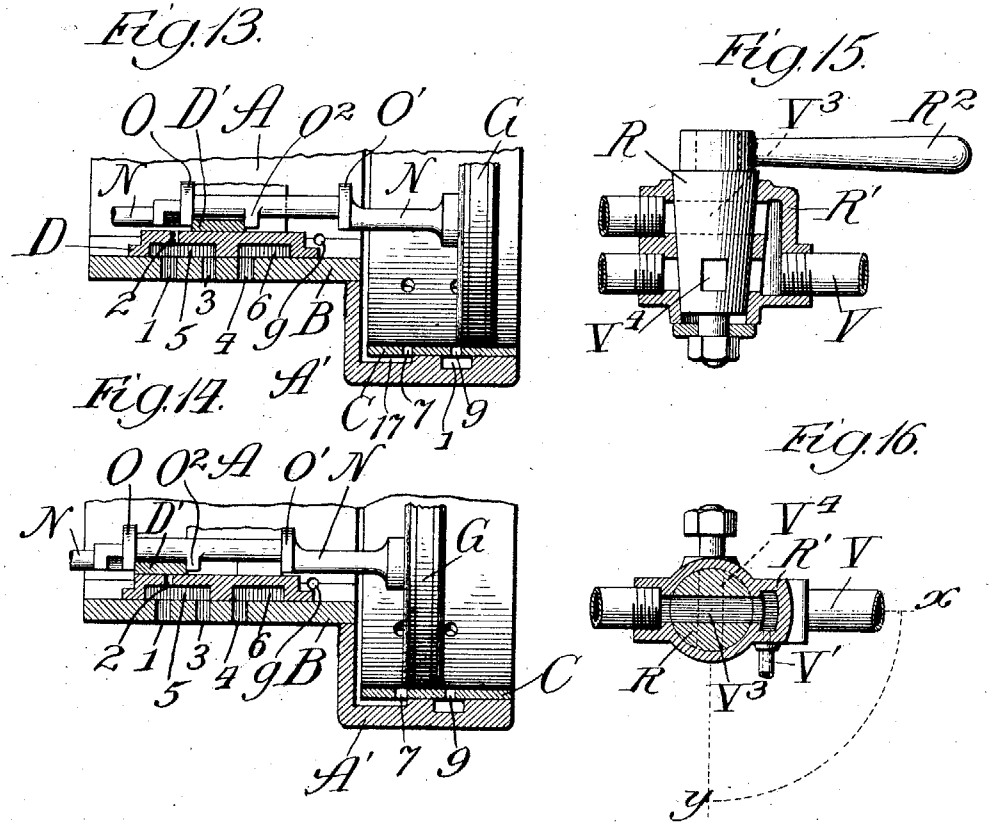
Witnesses:
Chas. E. Gaylord,
Geo. E. Kavieu
Inventor:
Joseph Reichmann,
By Dyrenforth, Dyrenforth & Lee,
Attys.

No. 12,207. Reissued March 22, 1904.

UNITED STATES PATENT OFFICE.

JOSEPH REICHMANN, OF CHICAGO, ILLINOIS.

FLUID-PRESSURE BRAKE APPARATUS.

SPECIFICATION forming part of Reissued Letters Patent No. 12,207, dated March 22, 1904.

Original No. 732,375, dated June 30, 1903. Application for reissue filed January 9, 1904. Serial No. 188,417.

*To all whom it may concern:*

Be it known that I, JOSEPH REICHMANN, a citizen of the United States, residing at Chicago, in the county of Cook and State of Illinois, have invented a new and useful Improvement in Fluid-Pressure Brake Apparatus, of which the following is a specification.

The primary object of my invention is to provide a novel construction of fluid-pressure brake apparatus which shall adapt it to be used at will as an automatic brake or a non-automatic brake by manipulating the engineer's brake-valve to charge the brake-cylinders with compressed air from the auxiliary reservoir or from the main reservoir to apply the brakes.

Referring to the accompanying drawings, Figure 1 is a longitudinal vertical section of the triple valve; Fig. 2, a section taken at the line 2 on Fig. 3 and viewed in the direction of the arrow; Fig. 3, a longitudinal horizontal section of the casing of the triple valve; Fig. 4, a broken section taken at the line 4 on Fig. 3 and viewed in the direction of the arrow; Fig. 5, a section taken at the line 5 on Fig. 3 and viewed in the direction of the arrow; Fig. 6, a section taken at the line 6 on Fig. 3 and viewed in the direction of the arrow; Fig. 7, a section taken at the line 8 on Fig. 3 and viewed in the direction of the arrow; Fig. 8, a section taken at the line 7 on Fig. 3 and viewed in the direction of the arrow; Fig. 9, a plan view, partly broken, showing the triple valve in elevation and the brake-cylinder and auxiliary reservoir in section; Fig. 10, a broken plan view showing the engineer's valve and the main reservoir; Fig. 11, a top plan view of an auxiliary valve; Fig. 12, a cross-section of the same; Fig. 13, a broken longitudinal vertical section of the triple valve; Fig. 14, a similar view of the same, but showing the valve in a different position; Fig. 15, a vertical section of the engineer's valve, and Fig. 16 a horizontal section of the same.

The triple valve is composed of the slide-valve chamber in the casing A, the cylinders A′ and P′, the slide-valve seat B, the cylinder-head P, and the chamber E, and it contains, as usual, ports and passages communicating with the train-pipe, the brake-cylinder, the auxiliary reservoir, and the atmosphere. The casing A contains the passage J for pipe connection with the train-pipe V, the passage L for pipe connection with the brake-cylinder U, the passages 1 and 8, and the branch K, at which latter to connect the slide-valve chamber with the auxiliary reservoir Q. The cylinder A′ is formed in one piece with the casing or chamber A and contains a bushing C, provided with ports 7 and 9, which register, respectively, with the passage 17 and the extension of the passage 1 and the cylinder-wall, whereby the port 7 leads immediately into the slide-valve chamber and the port 9 opens into the passage 1. The valve-seat B contains the port 3, opening into a passage L, Fig. 3, the port 4 opening into the exhaust-passage, (indicated by dotted lines in Fig. 3,) which leads directly to the atmosphere and the passage 1. The piston G, which is suitably packed and is provided with the stem N, moves freely in the cylinder A′ and controls the ports 9 and 7. On the stem N, which is guided by the chamber E, are provided the collars O and O′ and the shoulder $O^2$.

D is the slide-valve between the collars O O′, whose downward-projecting portions extend into the path of the valve and afford abutments, by which it is shifted, and it contains the port 2 and the cavities 5 and 6, and it controls the ports 3 and 4 by the motion of the piston G, its movement being limited by a pin *g*. The valve D is also provided with an auxiliary valve D′ between the collar O and shoulder $O^2$ to move with the stem N for opening and closing the port 2.

The head P, which is bolted to the cylinder A′, has formed upon it the cylinder P′ and a valve device Z and carries a stuffing-box $P^2$, and a passage 8 leads through the cylinders P′ and A′ and in the casing A to the passage L. The cylinder P′, which is provided with an internal bushing, as shown, is closed at one end by the screw-plug $P^3$ and contains a suitably-packed piston F, adapted to slide freely in the cylinder and provided with a stem F′, passing through the stuffing-box $P^2$ into the cylinder A′ to any desired distance. The chamber of the valve Z is closed at one end by a hollow screw-plug $P^6$, forming a housing for the spring $P^4$ and a guide for the stem $P^5$, surrounded by and confining the spring to cause it to hold the valve yieldingly against its seat, this valve controlling the passage 1, as shown in Fig. 5, to admit air-pressure from the port 9 into the chamber of valve Z below the valve, the tension of the spring $P^4$ being adjusted to attain the desired reduction of air-pressure in the brake-cylinder. Obviously a weight may be substituted for the spring $P^4$.

Figs. 11 and 12 of the drawings show means for adjusting the valve Z to charge the brake-cylinders with a varying pressure from a uniform pressure in the train-pipe supplied from the main reservoir. A stem $P^7$ passes through the stuffing-box $P^6$ and forms the housing for the spring $P^4$ and the guide for the stem $P^5$, and it is screw-threaded, so that by turning the stem through the medium of its hand-wheel $P^8$ the tension of the spring may be adjusted as desired, and the communication between the main reservoir and the brake-cylinder may be entirely shut off. The wheel $P^8$ is provided with peripheral notches, as shown, to engage for locking it with a spring $P^9$, which may be readily disengaged when it is desired to turn the wheel for effecting tension adjustment of the spring. These notches may, if desired, be marked with a pressure-indicating scale.

The chamber E, bolted to the opposite end of the casing A, has formed in one piece with it a cylinder E′, containing a chamber for the valves $E^2$ and $E^3$, seating in bushings shown to be provided in said chamber. The cylinder E′ contains a piston $E^7$, suitably packed to slide freely in the bushing provided in the cylinder, Fig. 2, which is closed at one end by a screw-plug $a'$, in which the piston-stem is guided. The chamber E is also closed by a screw-plug $a$, containing a guide for the stem of the valve $E^3$, and the stem of the valve $E^2$ extends into the cylinder E′ and into the path of the piston $E^7$ therein. A screw-plug $E^4$ also closes the chamber E and forms a housing for a spring $E^5$ and a guide for the stem $E^6$, surrounded by the spring, which is thus confined to hold the valve $E^2$ yieldingly against its seat. The chamber E communicates with the train-pipe V through the passage J and with the cylinder E′ above the piston $E^7$ therein through a passage $u$. The cylinder E′ communicates from below the piston $E^7$ with the auxiliary reservoir Q through the branch K and a passage $o$, while a passage $J^2$ leads from the chamber E into the passage 1 and through the port 3 and passage L into the brake-cylinder U.

The engineer's valve, Fig. 15, comprising the plug R in the shell R′ and provided with the operating-handle $R^2$, contains the ports $V^3$ and $V^4$, having suitable pipe connections and registering with ports in the shell, as usual. In the position of the valve represented in Fig. 15 air-pressure from the main reservoir T, Fig. 10, passes through the port $V^3$ into the train-pipe V; but by turning the handle from the position indicated at $x$ on Fig. 16 to the position indicated at $y$ on the same figure—that is, through an arc of ninety degrees—the port $V^3$ is closed and the port $V^4$ is opened, whereby air-pressure from the train-pipe will escape through the port $V^4$ to the atmosphere.

The main reservoir T, the auxiliary reservoir Q, and the brake-cylinder U are of usual construction and are secured in their respective positions on the locomotive and car. The pipe $V^2$ leads from the main reservoir to the usual air compressor (not shown) and connects with the train-pipe V, extending throughout the train in the usual manner, being closed at its rear end and communicating with the triple valve on each car through the pipe J, which contains a cock J′, Fig. 9. The train-pipe also communicates with a pressure-gage (not shown) connected with the pipe V′ and secured, like the engineer's valve, in a position convenient to the engineer. The reservoir Q is connected with the triple valve at the flange on the branch K, Fig. 3, and the brake-cylinder U contains the usual spring-controlled piston, Fig. 9, and is connected by the pipe L′ with the passage L in the triple valve. The triple valve, as shown in Fig. 1, is in the condition in which the brakes are released. By admitting air-pressure from the reservoir T through the valve R into the train-pipe the air-pressure enters the cylinder A′ through the passage J and passes through the port 7 into the chamber A and through the branch K into the reservoir Q.

To apply the brakes, the air is discharged through the valve R to reduce the air-pressure in the train-pipe, and thereby reduce it in the chamber A′, to cause movement of the piston G that will close the port 7 and shift the valves D′ and D to the positions in which they are represented in Fig. 13, and the piston F is shifted by the piston G. In this position the port 2 is open, as is also communication between the auxiliary reservoir Q and the cylinders U and P′. Air-pressure from the reservoir Q passes through the port 2, the cavity 5, port 3, and the passage L into the cylinder U and through the passage 8 into the cylinder P′, and by its consequent expansion the pressure in the reservoir Q is reduced and that in the cylinders U and P′ is increased and acts against the piston F and, with the reduced pressure in the train-pipe, forces the piston G to its position of closing the port 9, and the valve D′ is also shifted and the port 2 is closed, whereby the pressure on opposite sides of the piston G is equalized, causing it to remain stationary in the neutral position. By discharging air-pressure from the main reservoir T into the pipe V through the valve R the piston G is forced from the neutral position to the position in which it is represented in Fig. 14, wherein the port 9 is open, the valve D remaining stationary, and the air-pressure supplied from the main reservoir passes through port 9, opens the valve Z, and passes through the passage 1, cavity 5, port 3, and passage L into the brake-cylinder U. The air-pressure in the train-pipe (indicated by the pressure-gage) is governed by the valve R, so that the triple valve may be retained in the position illustrated in Fig. 14, wherein communication between the main reservoir and cylinders U and P′ is open, and a quantity of air-pressure may be discharged from the main reservoir into the train-pipe to produce and retain the pressure desired in the brake-cylinder whereby with the valve Z equally adjusted, as shown in Fig. 5, all the brake-cylinders will be charged with uniform pressure from the main reservoir by manipulating the engineer's valve. By the arrangement illustrated in Fig. 12 the valve Z may be adjusted to charge each brake-cylinder from the main reservoir with a different pressure, corresponding with the weight on the wheels of the respective cars to prevent them from sliding. To release the brakes, the triple valve is brought into the condition represented in Fig. 1 by the united forces acting upon the pistons G and F, and thus with a lower pressure in the pipe V than in the auxiliary reservoir Q. The port 9 and the communication with the main reservoir remain open; but the air-pressure admitted through the port 9 is stopped in its course to the cylinders U and P′ by the valve Z, owing to the force required to open that valve against the resistance of the spring $P^4$ and the brake-cylinder pressure above the valve, and thus increase is prevented of the pressure in these cylinders. By a sufficient reduction of the pressure in the train-pipe the triple valve is brought to and retained in the condition in which communication is open between the reservoir Q and the cylinder U. By again restoring the pressure in the train-pipe to bring the triple valve to the condition represented in Fig. 1 the air-pressure from the cylinders U and P′ will escape through the port 3, cavity 6, and port 4 and through the independent passage leading directly into the atmosphere, and thus release the brakes. For the service application of the brakes the brake-cylinders may be charged at will with air-pressure from the auxiliary reservoir or from the main reservoir, and the supply of air-pressure from the main reservoir to the brake-cylinders may be retained until it is desired to release the brakes. For the emergency application of the brakes the brake-cylinders are charged with air-pressure from the auxiliary reservoir. By reducing the pressure in the train-pipe the pressure above the piston $E^7$ is also reduced and that piston is forced upward by the superior air-pressure from the reservoir Q acting below the piston and opens the valve $E^2$ against the resisting force of the spring $E^5$. The valve D is in the position shown in Fig. 13, and the air-pressure from the passage J will open the valve $E^3$ and flow through the passages $J^2$ and the cavity 5 of the valve D, the port 3, and the passage L into the cylinders U and P′. The valve $E^3$ closes at the instant that the pressure equalizes on its opposite sides and prevents a return flow of the air-pressure. The valve $E^2$ will close by restoring the air-pressure in the train-pipe, and thus above the piston $E^7$. When the brake is released, communication between the chamber E and the brake-cylinder is closed by the valve D in its position in Fig. 1 by closing port 3 and the passages 1 and $J^2$. This auxiliary device remains inert during the operation of the triple valve until the pressure in the train-pipe is so reduced as to produce a sufficient difference between the train-pipe pressure and that in the reservoir Q to cause the spring $E^5$ to yield to the force of the piston $E^7$, the tension of the spring being adjusted to control as desired the charge of air-pressure from the train-pipe into the brake-cylinder relative to time and quantity.

In Figs. 1, 3, and 6 I show a slightly-modified construction of the triple valve. A passage $J^3$ (indicated by dotted lines) affords communication between the passages J and 1. By this arrangement air-pressure from the reservoir T is admitted through the passage $J^3$ into the passage 1 and into the chamber Z below the valve therein, and by opening the valve Z against the resistance of the spring $P^4$ the flow will be through the passage 1, cavity 5, port 3, and passage L into the brake-cylinder. The port 9 in the bushing C within the cylinder A′ would thus be omitted; but the port 2 would be retained and controlled by the valve D′ to charge the brake-cylinder from the reservoir Q, as hereinbefore explained. The piston F may also then be omitted and the brakes released under a pressure in the train-pipe V superior to that in the reservoir Q.

From the foregoing description of the mechanism it will be apparent that by reducing the train-pipe pressure the apparatus will act as an automatic brake and charge the brake-cylinders with air from the auxiliary reservoirs for service and emergency application in conjunction with the quick-acting triple valves at present in use. By the automatic brake system communication between the train-pipe, the main reservoir, and the air-compressor is cut off by the engineer's valve, thereby preventing recharging of the auxiliary reservoirs until the brakes are released, during which time no air-pressure can be charged into the brake-cylinders to check the speed of a train on the downgrade; but by opening communication between the main reservoir and the train-pipe through the engineer's valve my improved apparatus acts as a non-automatic brake, since the brake-cylinders are charged with air-pressure from the main reservoir, with which they are in direct communication. As the supply of air from the main reservoir is controlled through the engineer's valve, any suitable pressure may be retained in the brake-cylinders until it is desired to release the brakes. In connection with the non-automatic feature each brake-cylinder may be charged with air-pressure corresponding to the weight on the car-wheels, as and for the purpose hereinbefore stated. By the air-pressure acting upon the auxiliary piston F the brakes are released with a lower pressure in the train-pipe than in the auxiliary reservoirs, whereby the brakes are released quickly and positively, irrespective of the length of the train, since the higher air-pressure will flow to the lower pressure, and any small leak in the triple valve will have no tendency to prevent its action, as the pressure on the piston F will operate it, while the pressure on the opposite sides of the piston G is equal. On the other hand, without the provision of the piston F of my improved system when the brakes are released by superior pressure in the train-pipe the triple valves must be in perfect condition; otherwise their leakage in a long train will reduce the pressure in the train-pipe and main reservoir and increase the pressure in the auxiliary reservoirs, and thereby tend to equalize the pressure on opposite sides of the valve-controlling pistons, with the effect of preventing release of the brakes.

What I claim as new, and desire to secure by Letters Patent, is—

1. In a fluid-pressure brake apparatus, the combination with appliances adapted to charge the brake-cylinder with air-pressure from the auxiliary reservoir and to charge the brake-cylinder with air-pressure from the main reservoir independently of the auxiliary reservoir, and to exhaust the air from the brake-cylinder through an independent passage leading directly to the atmosphere, and a single line of pipe-connection, of a main reservoir, a train-pipe, and a valve device interposed between the main reservoir and train-pipe and adapted to govern the supply of air-pressure from the main reservoir to the train-pipe, substantially as described.

2. In the triple valve of a fluid-pressure brake apparatus, the combination of ports through which the air from the auxiliary reservoir and from the main reservoir passes to the brake-cylinder, and from the brake-cylinder to the atmosphere to exhaust the air from the brake-cylinder, valves controlling said ports, and a piston for actuating the triple valve to charge the brake-cylinder with air from the auxiliary reservoir by reducing the train-pipe pressure and to charge the brake-cylinder with air from the main reservoir by increasing the train-pipe pressure, substantially as described.

3. In the triple valve of a fluid-pressure brake apparatus, the combination of a piston actuated in one direction by auxiliary-reservoir pressure and in the opposite direction by train-pipe pressure, and valves controlling the passages of air from the auxiliary reservoir and from the main reservoir to the brake-cylinder and from the brake-cylinder through an independent passage leading directly to the atmosphere, to charge the brake-cylinder with air from the auxiliary reservoir by reducing the train-pipe pressure and to charge the brake-cylinder with air from the main reservoir by increasing the train-pipe pressure, substantially as described.

4. In the triple valve of a fluid-pressure brake apparatus, the combination of a valve-chamber having ports through which air passes to the brake-cylinder from the auxiliary reservoir and from the main reservoir, and from the brake-cylinder to the atmosphere to exhaust the air from the brake-cylinder, a slide-valve and an auxiliary valve controlling said ports, and a piston movable by variation in the train-pipe pressure to actuate the triple valve to charge the brake-cylinder with air from the auxiliary reservoir by reducing the train-pipe pressure and to charge the brake-cylinder with air from the main reservoir by increasing the train-pipe pressure, substantially as described.

5. In the triple valve of a fluid-pressure brake apparatus, the combination of a valve-chamber having ports through which air passes to the brake-cylinder from the auxiliary reservoir and from the main reservoir, and from the brake-cylinder to the atmosphere to exhaust the air from the brake-cylinder, a piston-chamber having a port leading to the brake-cylinder, and a slide-valve and a piston-valve jointly controlling the said ports to charge the brake-cylinder with air from the auxiliary reservoir by reducing the train-pipe pressure and to charge the brake-cylinder with air from the main reservoir by increasing the train-pipe pressure, substantially as described.

6. In the triple valve of a fluid-pressure brake apparatus, the combination of a valve-chamber having ports through which air passes to the brake-cylinder from the auxiliary reservoir and from the main reservoir, and from the brake-cylinder through an independent passage leading directly to the atmosphere to exhaust the air from the brake-cylinder, a valve controlling the said ports and the valve Z in the passage 1 and actuated by the air-pressure from the main reservoir, substantially as described.

7. In the triple valve of a fluid-pressure brake apparatus, the combination of a port through which the air from the auxiliary reservoir passes to the brake-cylinder, a port leading to the atmosphere to exhaust the air from the brake-cylinder, a valve controlling said ports, a main piston operating to move the said valve in one direction by auxiliary-reservoir pressure, and an auxiliary piston actuated in one direction by valve-controlled air-pressure coöperating with the train-pipe pressure to force the main piston in the opposite direction to control the said ports leading to and from the brake-cylinder, substantially as described.

8. In the triple valve of a fluid-pressure brake apparatus, the combination of a valve-chamber having a port through which the air from the auxiliary reservoir passes to the brake-cylinder, a port leading to the atmosphere to exhaust the air from the brake-cylinder, a slide-valve controlling said ports, a piston-chamber, a main piston operating to move said slide-valve in one direction by auxiliary-reservoir pressure, the head P provided with the stuffing-box $P^2$, the cylinder P′, the passage 8 between the brake-cylinder and the said cylinder P′, and the piston F on a stem and actuated by air-pressure in the cylinder P′ in conjunction with the main piston to move the said slide-valve in the opposite direction to control said ports, substantially as described.

9. In the triple valve of a fluid-pressure brake apparatus, the combination of a piston controlling the releasing-valve, an auxiliary valve and an auxiliary piston for actuating it, and each controlled independently of the other by variation of the train-pipe air-pressure, and jointly controlling communication between the train-pipe and the brake-cylinder to reduce the train-pipe pressure by admitting the air into the brake-cylinder for the emergency application of the brakes, substantially as described.

10. In the triple valve of a fluid-pressure brake apparatus, the combination with the releasing-port communicating with the train-pipe of the piston-chamber E′ having a piston $E^7$ and having direct communication with the auxiliary reservoir and the train-pipe, substantially as described.

11. In the triple valve of a fluid-pressure brake apparatus, the combination with the releasing-valve controlling communication with the train-pipe, of the chamber E, the valves $E^2$ and $E^3$, the spring $E^5$, the passage J and the passage $J^2$, substantially as described.

JOSEPH REICHMANN.

In presence of—
WALTER N. WINBERG,
F. M. WIRTZ.